(12) United States Patent
Roeland et al.

(10) Patent No.: US 9,614,757 B2
(45) Date of Patent: Apr. 4, 2017

(54) METHOD AND ARRANGEMENT FOR RELOCATING PACKET PROCESSING FUNCTIONS

(71) Applicant: Telefonaktiebolaget L M Ericsson (PUBL), Stockholm (SE)

(72) Inventors: Dinand Roeland, Sollentuna (SE); Conny Larsson, Åkersberga (SE); Gunnar Mildh, Sollentuna (SE); Rashmi Purushothama, Sundbyberg (SE); Johan Rune, Lindingö (SE); Zoltán Turányi, Szentendre (HU); András Zahemszky, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 142 days.

(21) Appl. No.: 14/422,745

(22) PCT Filed: Dec. 17, 2014

(86) PCT No.: PCT/EP2014/078330
§ 371 (c)(1),
(2) Date: Feb. 20, 2015

(87) PCT Pub. No.: WO2016/096002
PCT Pub. Date: Jun. 23, 2016

(65) Prior Publication Data
US 2016/0344621 A1 Nov. 24, 2016

(51) Int. Cl.
*H04W 36/22* (2009.01)
*H04L 12/721* (2013.01)
*H04L 12/803* (2013.01)

(52) U.S. Cl.
CPC ............ *H04L 45/38* (2013.01); *H04L 47/122* (2013.01); *H04W 36/22* (2013.01)

(58) Field of Classification Search
CPC ..... H04W 24/10; H04W 24/02; H04W 28/06; H04W 8/08; H04W 36/22; H04L 70/236;
(Continued)

(56) References Cited

U.S. PATENT DOCUMENTS

2003/0161260 A1* 8/2003 Murugan .................. H04J 3/08
370/217
2010/0027497 A1* 2/2010 Pelletier ................ H04W 28/06
370/329
(Continued)

OTHER PUBLICATIONS

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP TS 23.401, V13.1.0, 2014, 310 pages.
(Continued)

*Primary Examiner* — Afsar M Qureshi
(74) *Attorney, Agent, or Firm* — Rothwell, Figg, Ernst & Manbeck, P.C.

(57) ABSTRACT

The invention relates to a method in an arrangement of a communication network, controlling a chain of functions for processing data packets of a flow associated with a device. The method comprises obtaining (610) an indication indicating that information associated with a context of at least one of the functions has been altered. The context is related to the flow and at least one of the communication network, the device, a route of the flow, and a source instance of each of the at least one function. The method further comprises determining (620) to relocate the at least one function for processing the data packets from the respective source instance to a respective target instance based on the obtained indication. The method also comprises relocating (630) the at least one function for processing the data packets to the respective target instance.

17 Claims, 12 Drawing Sheets

(58) Field of Classification Search
CPC ..... H04L 70/329; H04L 70/474; H04L 45/38; H04L 47/122
USPC .................................................. 370/329, 236
See application file for complete search history.

(56) References Cited

U.S. PATENT DOCUMENTS

| | | | | |
|---|---|---|---|---|
| 2010/0037311 | A1* | 2/2010 | He | H04L 63/0209 726/15 |
| 2010/0124933 | A1* | 5/2010 | Chowdhury | H04L 12/5695 455/453 |
| 2011/0280127 | A1* | 11/2011 | Raaf | H04L 45/125 370/230 |
| 2012/0019365 | A1* | 1/2012 | Tuikka | G06Q 30/02 340/10.1 |
| 2016/0029278 | A1* | 1/2016 | Poikonen | H04W 36/12 370/331 |

OTHER PUBLICATIONS

3GPP, 3rd Generation Partnership Project; Technical Specification Group Services and System Aspects; Architecture enhancements for non-3GPP accesses (Release 13), 3GPP TS 23.402, V13.0.0, 2014, 290 pages.

International Search Report and the Written Opinion of the International Searching Authority, issued in corresponding International Application No. PCT/EP2014/078330, dated Sep. 4, 2015, 12 pages.

Taleb Tarik et al, "Follow-Me Cloud: An OpenFlow-Based Implementation", 2013 IEEE International Conference on Green Computing and Communications and IEEE Internet of Things and IEEE Cyber, Physical and Social Computing, IEEE, (20130820), doi:10.1109/Greencom-Ithings-cpscom.2013.59, pp. 240-245, XP032530729.

Maini Elisa et al, "A compositional modelling approach for live migration in Software Defined Networks", 2014 International Conference and Workshop on the Network of the Future (NOF), IEEE, (Dec. 8, 2014), vol. Workshop, doi:10.1109/NOF.2014.7119790, pp. 1-6, XP032783623.

Valtulina Luca et al, "Performance evaluation of a SDN/OpenFlow-based Distributed Mobility Management (DMM) approach in virtualized LTE systems", 2014 IEEE Globecom Workshops (GC WKSHPS), IEEE, (Dec. 8, 2014), doi:10.1109/GLOCOMW.2014.7063379, pp. 18-23, XP032747740.

Qualcomm Europe, "AGW relocation in LTE_ACTIVE", 3GPP Draft; R3-060424 AGW Relocation in LTE_ACTIVE, 3RD Generation Partnership Project (3GPP), Mobile Competence Centre; 650, Route Des Lucioles; F-06921 Sophia-Antipolis Cedex; France, (20060329), vol. Ran WG3, no. Sophia Antipolis, France; 20060329, XP050159352.

* cited by examiner

METHOD AND ARRANGEMENT FOR RELOCATING PACKET PROCESSING FUNCTIONS

CROSS REFERENCE TO RELATED APPLICATION(S)

This application is a 35 U.S.C. §371 National Phase Entry Application from PCT/EP2014/078330, filed Dec. 17, 2014, designating the United States, the disclosure of which is incorporated herein in its entirety by reference.

TECHNICAL FIELD

The disclosure relates to control of a chain of functions for processing data packets of a flow associated with a device, wherein the functions of the chain run in a distributed processing environment. The disclosure relates more specifically to a method and an arrangement for relocating functions in the chain of functions.

BACKGROUND

Long Term Evolution (LTE) is the fourth-generation (4G) wireless communication technologies standard developed within the $3^{rd}$ Generation Partnership Project (3GPP) to improve the Universal Mobile Telecommunication System (UMTS) standard. The Evolved Universal Terrestrial Radio Access Network (E-UTRAN) is the RAN of an LTE system. In an E-UTRAN, a User Equipment (UE) is wirelessly connected to a Base Station (BS) commonly referred to as an evolved NodeB (eNodeB or eNB) in LTE. A BS is a general term for a network node capable of transmitting radio signals to a wireless device and receiving signals transmitted by the wireless device.

System Architecture Evolution (SAE) is the core network architecture of 3GPP's LTE wireless communication standard. The SAE has a flat, all-Internet Protocol (IP) architecture with separation of control plane and user plane/data traffic. The main component of the SAE architecture is the Evolved Packet Core (EPC), also known as SAE Core. Some important subcomponents of the EPC are Mobility Management Entity (MME) which is the key control node for the LTE access-network, Serving Gateway (SGW) which routes and forwards user data packets, Packet data network Gateway (PGW) providing connectivity from the UE to external packet data networks by being the point of exit and entry of traffic for the UE and acting as the mobility anchor for the user plane during inter-eNodeB handovers and as the anchor for mobility between LTE and other 3GPP technologies, and Home Subscriber Server (HSS) which is a central database that contains user-related and subscription-related information.

A communications network, which may be a wireless communication network, can be viewed in many ways. One way is a deployment view, where deployment refers to the physical placement of network equipment. Equipment is placed at sites. FIG. 1a shows such sites and how they may be connected.

End user devices are not illustrated in FIG. 1a. However, a device may be connected to the network, e.g., via a base station illustrated by an antenna icon, via a small cell and distributed radio (DR), or via a fixed line or a WiFi link illustrated in the FIG. 1a by a house icon or an office icon. Traffic is carried through an aggregation network, where Ac in the FIG. 1a is used for access sites and Ag is used for aggregation sites. Access and aggregations sites are often called hub sites or central office sites. Further aggregation may be done through a backbone network (BB) towards centralized data centers (DC). Some of these data centers may also act as a primary site (P). Some data centers, illustrated as the globe icons in FIG. 1a, may also do peering towards external Internet. Note that site naming is not standardized and may differ between operators. The naming above is just one example.

The deployment may be visualized in another way, illustrated in FIG. 1b. Different network services are mapped to different sites in this view. The services are here the network nodes of the 3GPP Evolved Packet Core (EPC) architecture as defined in the 3GPP standard (TS 23.401). Local sites may host antennas and eNBs. Regional sites are mainly used for aggregation. National sites host core network nodes like MME, SGW, PGW and Policy and Charging Control Function (PCRF). Some national sites may act as primary sites hosting user subscription information in a HSS.

To give an example, a large operator with more than 100 million subscribers spanning a large country may have 50000 BS sites, 150 central office sites, 25 regional data centers and 5 national data centers where each national data center also does peering towards external Internet. A BS site spans a couple of thousands of end users in a city district, a central office site spans a larger city, a regional data center spans a few million users in a part of a large state or in a number of small states, and a national data center spans tens of millions of users in a complete region of the country.

The current 3GPP EPC architecture is an anchored architecture. This means that all traffic of an Access Point Name (APN) of a user device needs to pass through one and the same PGW. With such architecture and a deployment as described above, it will be clear that the traffic in the network will follow a topological tree structure. The leaves of the tree are the end devices, the branches are the local and regional sites, and the trunk is the national data center hosting the PGW. Traffic from one end device to another end device will have to pass at least one, sometimes even two, PGWs. This also means that there may be a large latency in the transport of the packets, even if the two end devices are physically close to each other. The PGW may be hosted in a national data center physically far from the end devices. This applies also when one of the devices is located in another network, e.g. a server on the Internet.

IP networks use address aggregation to achieve routing scalability. This results in IP addresses having location significance in the network. That is, when a device with an IP address moves, it is not easy to reflect the change of the location of its IP address in the routing system. This is usually solved by allocating a fixed-location anchor point to the device managing its IP address. The anchor would then tunnel the traffic incoming to the device to the current location of the device. Mobile IP or General Packet Radio Service (GPRS) Tunneling Protocol (GTP) are protocols doing this. In the following, the place in the network topology where the IP address of the device is advertised is called an IP Advertisement Point (IAP). In today's mobile and fixed networks the IAP of the end user device, sometimes referred to as the UE, is typically anchored in a node as already mentioned above. In an anchored architecture, the IAP acts as anchor and is located in e.g. the PGW or a Broadband Network Gateway (BNG) for as long as the UE is using that IP address. The UE may e.g. use the IP address until the UE detaches or the IP address is released or re-assigned e.g. using Dynamic Host Configuration Protocol (DHCP).

All incoming traffic to the UE needs to go through the IAP, meaning the placement of the IAP in relation to the UE and its communication peer will determine how optimal the packet routing will be towards the UE. I.e. if the IAP is placed close to the UE, traffic from different sources can take a fairly optimal route to the IAP and the UE, if the IAP is far away from the UE, e.g. located on some core site, the traffic routing will often be less optimal. The drawback though of placing the IAP more distributed, i.e. closer to the UE, appears when the devices such as a wireless UE moves in the network. At that time the routing, although initially optimal, could become sub-optimal after some UE mobility. This is illustrated in the FIGS. 2a-d. In FIG. 2a, the IAP is placed in a central location. Routing of IP flow 1 is optimal but routing of IP flow 2 is sub-optimal. In FIG. 2b, the IAP is placed in a distributed location, leading to more efficient routing for both flows in the static case, i.e. when the UE is not moving. However, in FIG. 2c the IAP is also placed in a distributed location, leading to less efficient routing for both flows in the case of a mobile UE, and in FIG. 2d, the IAP is again placed in a central location, which in the mobility case leads to a more efficient routing for both flows in this example.

FIGS. 2a-2d thus illustrates how the placement of the anchor point or the IAP can support optimized routing. Moving an anchor is not possible. However, multiple IAPs may announce the same IP address. In such anchorless setup, optimized routing can be achieved by using that IAP that is on the optimal routing path. There may be one or more functions for processing data packets of a flow associated with a device or UE which are on the routing path UE-IAP-peer. If the data packets of the flow after movement of the UE start to go through a different path, and possibly via a different IAP, then those functions may still be on a sub-optimal routing path. Hereinafter, the term functions for processing data packets is equivalent to the term packet processing functions. Examples of packet processing functions are firewall, Network Address Translation (NAT), charging functions, policy functions, and lawful interception function.

SUMMARY

It is therefore an object to address some of the problems outlined above, and to provide a solution for enabling relocation of functions in a chain of functions for processing data packets of a flow associated with a device. This object and others are achieved by the method and the arrangement according to the independent claims, and by the embodiments according to the dependent claims.

In accordance with a first aspect, a method for an arrangement of a communication network is provided. The arrangement controls a chain of functions for processing data packets of a flow associated with a device. The functions of the chain run in a distributed processing environment. The method comprises obtaining an indication indicating that information associated with a context of at least one of the functions has been altered. The context is related to the flow and at least one of the communication network, the device, a route of the flow, and a source instance of each of the at least one function. The method further comprises determining to relocate the at least one function for processing the data packets from the respective source instance to a respective target instance based on the obtained indication. The method also comprises relocating the at least one function for processing the data packets to the respective target instance.

In accordance with a second aspect, an arrangement for a communication network is provided. The arrangement is configured to control a chain of functions for processing data packets of a flow associated with a device. The functions of the chain run in a distributed processing environment. The arrangement is further configured to obtain an indication indicating that information associated with a context of at least one of the functions has been altered. The context is related to the flow and at least one of the communication network, the device, a route of the flow, and a source instance of each of the at least one function. The arrangement is further configured to determine to relocate the at least one function for processing the data packets from the respective source instance to a respective target instance based on the obtained indication. The arrangement is also configured to relocate the at least one function for processing the data packets to the respective target instance.

In accordance with further aspects, a computer program is provided. The computer program comprises computer readable code which when run on the arrangement causes the arrangement to perform a method in accordance with the first aspect above. A computer program product is also provided comprising a computer readable medium and the computer program stored on the computer readable medium.

An advantage of the different aspects above is that unnecessary relocations are avoided while at the same time allowing for optimized routing by taking contextual information and deployment aspects into account. Thereby, network resources can be used in a more optimal way, which may save operational expenses for an operator and increase the end user performance.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 3:
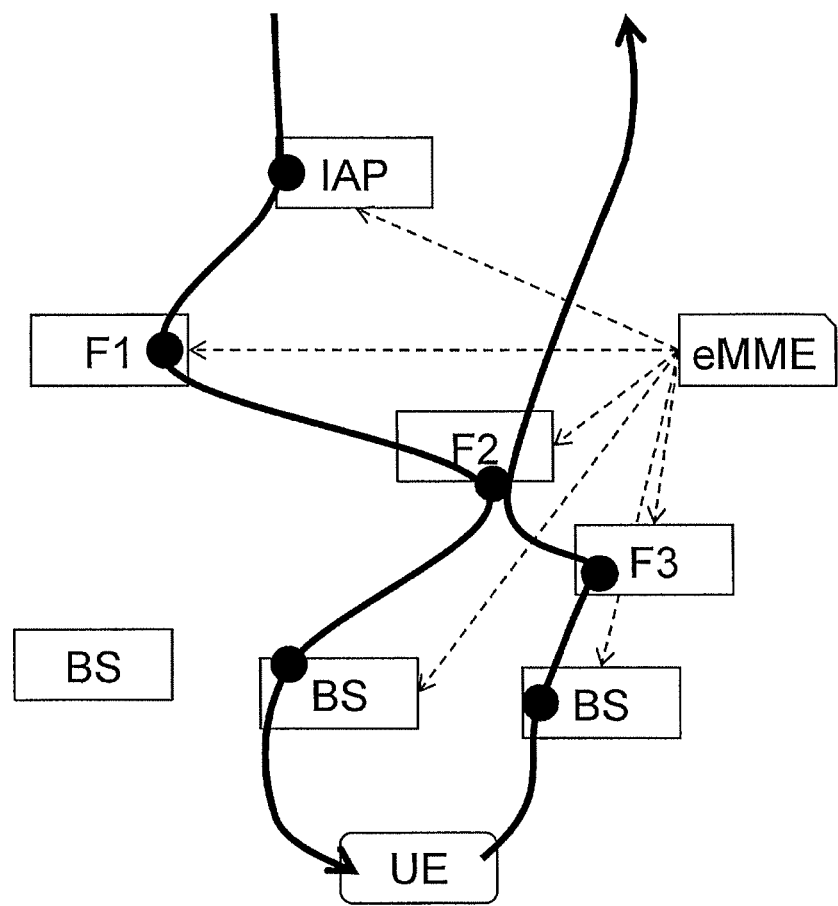
FIG. 3 is a schematic illustration of a high level overall fifth generation (5G) architecture.

Embodiments are described in a non-limiting general context in relation to an example scenario in a high level 5G network architecture in which user plane or data packet processing functionality is relocated. The high level 5G-architecture is schematically illustrated in FIG. 3, visualizing a draft version of one possible 5G-architecture. A mobile device, called UE has a radio interface with one or more BSs. The UE may exchange IP packets with a peer (not shown in FIG. 3). The peer may be on the same network, or may be in an external network, such as the Internet. The network operator domain includes, besides BSs, one or more IAPs, one or more evolved MMEs (eMME) handling all control plane related signalling and zero or more functions for processing data packets (F1, F2, F3). It should be noted that embodiments of the invention may be applied to any network architecture, so the 5G network architecture illustrated in FIG. 3 should be seen as an example. Embodiments of the invention may e.g. be applied in both wireless and fixed communication networks and for both wireless and fixed devices.

The problem of sub-optimal routing of flows that may occur for different IAP locations, e.g. when the UE is moving, may be addressed by an anchorless architecture where all packet processing functions can be relocated, even the one(s) that would normally constitute an anchor. A relocation of one or more functions for processing data packets of a flow associated with a device enables the change or relocation of the IAP for the device, in order to achieve an optimal routing of the data packets of a flow associated with a specific end user device.

In FIG. 3 described above, three packet processing functions are shown, F1, F2 and F3. For each data packet that such a function receives, the function performs some kind of processing and forwards the processed packet. Example functions include encryption/description of packets, policy and charging enforcement, deep packet inspection (DPI) and proxy functions. Functions may be chained, which means that a packet passes a function and is then forwarded to a next function of the chain. The chain of functions also comprises switching elements that routes the data packets to the correct function. These switching elements may or may not be co-located with the function. In one embodiment, the switching element bases its routing decision on routing rules and information in the header field of the packet. In other embodiments, the switching element may mark the packet in some way e.g. by adding an extra header field. Another switching element, later in the chain, will then use that marking to make its routing decision.

Chains of functions may be valid on various granularities, e.g. for a group of UEs, on a per-UE basis, or on a per-flow basis. The flow is defined by its five-tuple, i.e. source and destination IP addresses in the IP header, protocol field in the IPv4 header or next header field in the IPv6 header, and source and destination port numbers in the transport protocol header. The transport protocol may be Transmission Control Protocol (TCP), User Datagram Protocol (UDP), or Stream Control Transmission Protocol (SCTP). Function chains may be symmetrical or asymmetrical. In the symmetrical chain the same functions are passed in uplink and in downlink. The example in FIG. 3 shows a dual-radio UE with an asymmetrical chain, where functions F3 and F2 are passed in the uplink and functions F1 and F2 are passed in the downlink. In the uplink, the last function in the chain forwards the packet as a plain IP packet.

In the example scenario, function chains are set up and controlled by the eMME. The setup of a chain could be performed when the UE attaches to the network or when a new flow is started. A function chain for an aggregate of UEs can also be setup before the UEs' attach to the network. The functions may be part of a Software Defined Networking (SDN) environment and the eMME may act as an SDN controller.

The UE's IP address topologically belongs to one or more IAPs. This implies that each IP packet sent from the peer to the UE will pass one such IAP. The function of the IAP is to forward the packet to the first function in the downlink chain.

Initial Attach in the High-Level Architecture

Figure 4:
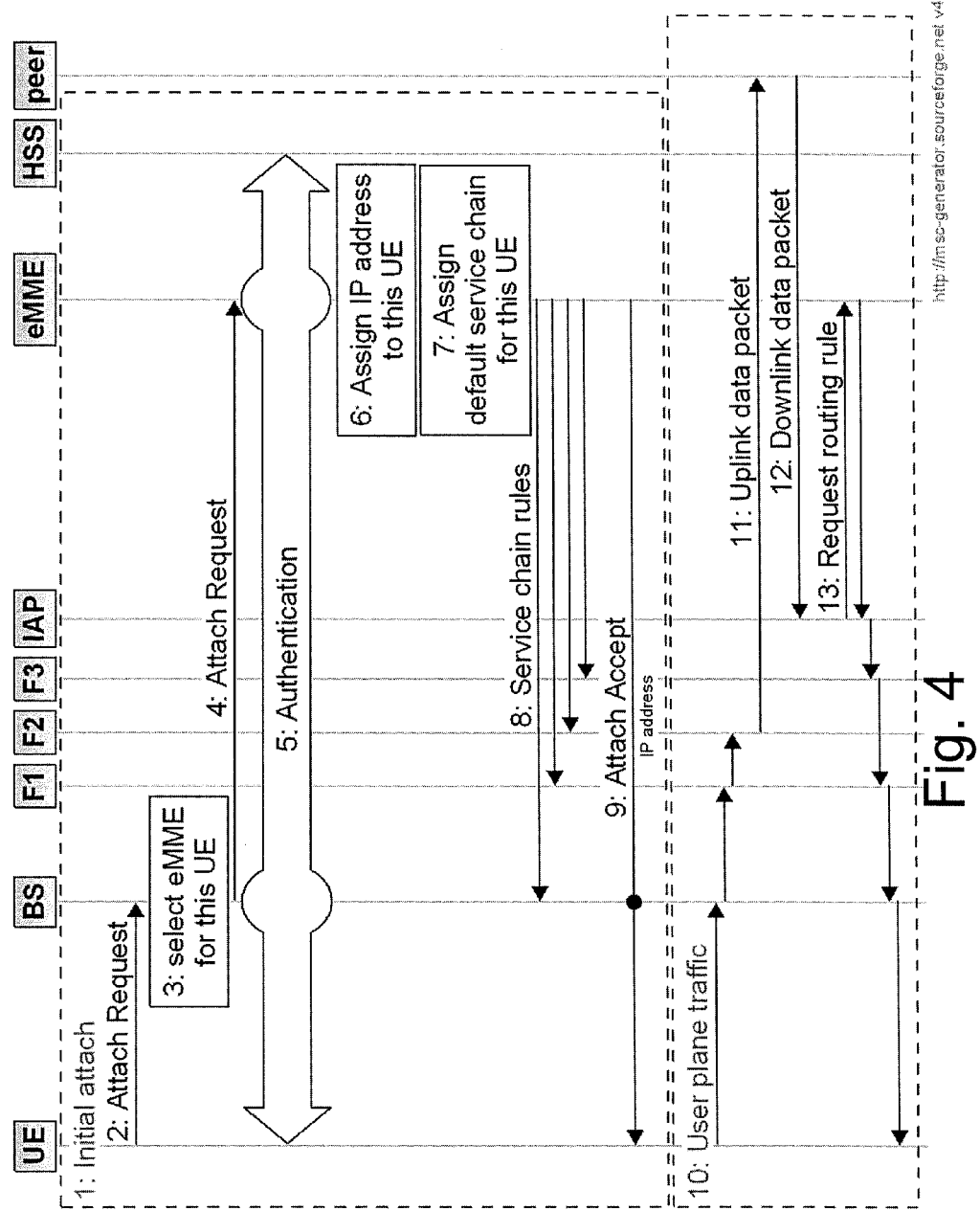
FIG. 4 is a signaling diagram illustrating the initial attach procedure in a network based on the high level 5G architecture.

The signaling diagram or call flow in FIG. 4 illustrates how an initial attach procedure is performed in a communication network based on the high-level architecture. In this example the UE attaches to a single BS. The chain of functions, also referred to as the service chain, for uplink packets comprises F1 and F2, and the service chain for downlink packets comprises F3 and F1. The service chain also comprises switching element that affects the routing of the data packets of the flow in the chain.

The BS receives the attach request message (step 2) and selects an eMME (step 3). The attach request message is then forwarded to the eMME (step 4) and an authentication is performed (step 5). The HSS may contain a user profile. After successful authentication, the eMME assigns an IP address to the UE (step 6) and sets up a default service chain (step 7-8). Every UE has a default service chain that is used for all flows to which no specific service chain is valid. At a later stage, not shown in this call flow, more specific service chains for this UE, e.g. for a single flow, may be added. Once the default service chain has been setup, the eMME sends an attach accept message to the UE (step 9). After that step, the UE may start to send uplink data (step 11) and may receive downlink data (step 12). For downlink packets, the IAP queries the eMME (step 13) to find out to which processing function to send the packet. The frequency of these requests can be optimized in several ways. E.g. the IAP can retrieve all routing rules for a particular UE or IP address and cache those.

One embodiment of the architecture shown in FIG. 3 is the existing EPC architecture, in which case the IAP, i.e. the PGW, is the only IAP that advertises the IP address for a certain UE as long as it remains attached to the network, i.e. an anchor-based architecture. Functions like Packet Data Convergence Protocol (PDCP) processing are then performed on the BS, which is called eNB. Functions like policy and charging enforcement are performed on the PGW and the forwarding between eNB and PGW is implemented using GTP tunnels. The service chains would be symmetrical. Additional functions like DPI and TCP proxying are placed "above" the PGW, i.e. after the PGW in the uplink direction.

Seen from a 5G perspective, the current EPC architecture as defined in 3GPP TS 23.401 and TS 23.402 has a number of drawbacks. One drawback is that the architecture lacks the concept of service chaining, and therefore does not provide flexible means to insert new functions in the chain or having multiple chains for a single UE. Another drawback is that all packets for a particular UE or a particular APN for a UE need to pass one and the same PGW. The PGW thus acts as an "anchor point". This may lead to sub-optimal routing.

As part of the 5G project an anchorless architecture is being studied. Another embodiment of the high-level architecture is such anchorless architecture. In that case, multiple IAPs may advertise the UE IP address into the IP routing system, so downlink packets may end up at one of several IAPs. Still each IAP would forward the packet to the first function in the downlink chain. Uplink packets sent from the last function in the chain can be routed directly to the Internet via the physically closest border router, or can be routed directly to an operator's IAP if the peer is connected to such an IAP. Different functions in the chain may be placed at different locations. In one scenario all functions could be co-located on the BS. In this way the most optimal routing would be achieved. In another scenario it may not be feasible to always place all functions on the BS. Some functions may be placed at a more central place in the network; e.g. in a regional or even a national data center site. At the setup time of the service chain, the eMME may find a service chain that provides an optimal route through the network. It should be noted that other traffic flows involving the same UE may pass through a different IAP and different service chains and different function locations may be used for these flows, e.g. in order to achieve optimal routing also for these flows.

Even if functions in an anchorless architecture are initially placed to achieve optimal routing, if the UE moves to another BS and the packet processing functions do not move, the route may become sub-optimal. Current virtualization and networking technologies do not provide a means to relocate a specific packet processing function from one instance to another instance for a service chain specific to a single end user. A function defines what to do with a packet. A function instance is executing the function at a specific location in the network deployment.

Generic Relocation Method

Figure 5A:
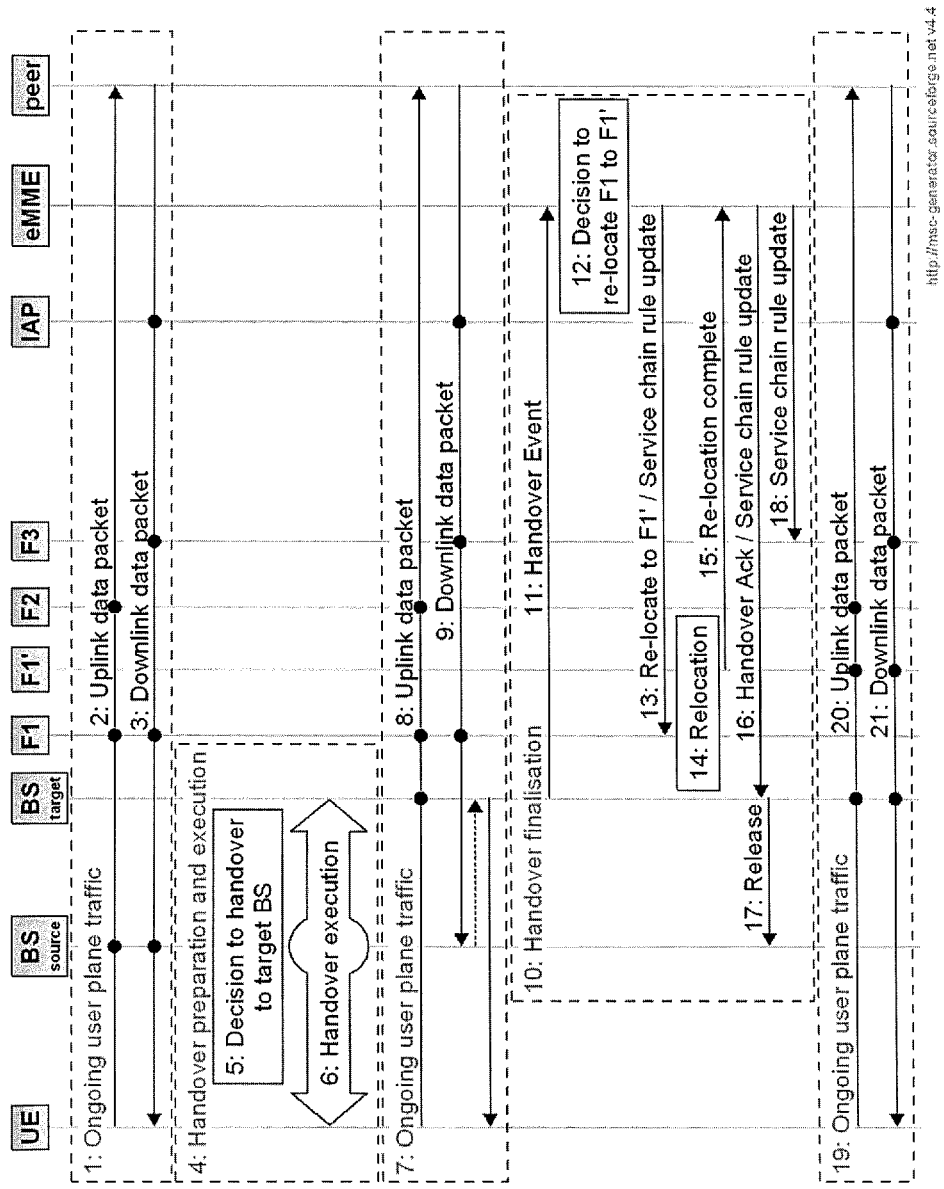
FIGS. 5a-b are signaling diagrams illustrating relocation methods.

The signaling diagram or call flow in FIG. 5a illustrates a generic relocation method procedure in the context of an inter-BS radio handover. The relocation method is part of block 10 which describes the handover finalization. The event that is triggering relocation is a handover of the UE from one BS to another. Other triggers are also possible, which will be further described below. The service chain consists of the same functions as those in the initial attach example. The handover, block 4, corresponds to the "X2-based handover" as defined in 3GPP TS 23.401.

In block 10, function F1 is relocated to a target instance of that same function. This target instance is denoted F1'. One way to relocate multiple functions would be to perform block 10 once for each function.

The eMME decides to relocate F1 to F1' (step 12) and instructs F1 to do a relocation (step 13). In the latter step the eMME also informs F1 about a service chain rule update, i.e., that downlink packets are to be sent to the target BS instead of to the source BS. The service chain rule update thus comprises an update of one or more switching elements in the chain of functions for processing the data packets of the flow. The switching elements are updated with information related to the relocated function. The actual relocation of the function is step 14. Multiple methods are possible here, and these are explained in subsequent sections. As part of step 14, F1 informs F1' of the now updated downlink service chain rule.

Once the relocation is done, F1' informs the eMME (step 15). The eMME then updates the proceeding and succeeding functions in the uplink service chain; the target BS is informed to send uplink data to F1' instead of to F1 (step 16), and F3 is informed to send downlink data to F1' instead of to F1 (step 18). The order in which 16 and 18 are performed is irrelevant.

To assist F1' in handling packets in-order, the "end marker" solution used for user plane forwarding at handovers in EPS can be reused here. E.g. in downlink, F3 can send an end marker to F1 right after the chain update (step 18). F1 forwards the end marker to F1'. After that, provided that F1 has no more uplink data to forward to either F3 or F1', F1 can also release its context. Alternatively, F1' can request F1 to release its context when F1' has received the end marker, either immediately upon receiving the end marker or a certain time after the reception of the end marker.

Step 16 may also serve as an acknowledgement to step 11. Such acknowledgement could then also trigger an explicit release message to the source BS (step 17). Alternatively, the release of the source BS is done implicitly by letting F1 send an end marker to the source BS.

Specific Methods to Relocate a Function

Hereinafter, example embodiments of relocation methods are described. They thus describe how step 14 in the call flow in FIG. 5a can be performed. There may be more examples of such relocation methods. Furthermore, the methods may be combined. As one example, one relocation method may be used for one subset of the flows in the chain, and another relocation method may be used for another subset of the flows in the chain. The eMME may instruct the function to use a specific relocation method. Alternatively, the function itself may decide which relocation method to use. The decision of what relocation method to use is further described below.

Figure 5B:
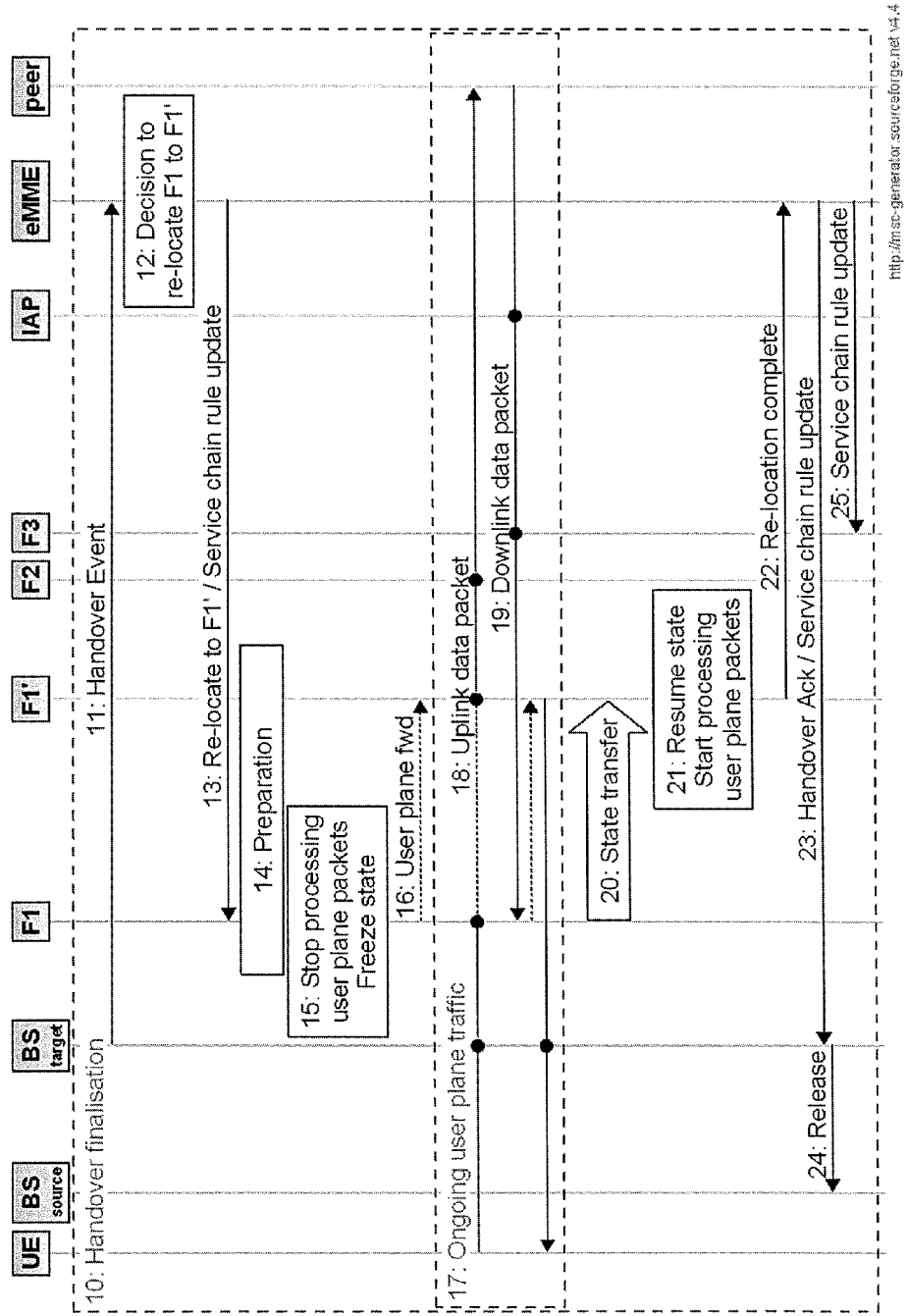

Freeze-Move-Resume Relocation Method (FIG. 5b)

The signaling diagram or call flow in FIG. 5b specifies block 10 of the generic call flow in FIG. 5a in more detail. The rest of the generic call flow remains the same.

In this relocation method, the state related to the user plane packet processing of the source instance of the function is frozen (step 15). Then all state is copied to the target instance of the function (step 20). Finally, packet processing is resumed in the target instance based on the copied state (step 21).

State involves all parameters related to the processing of the packets for this UE's service chain. Examples of such parameters include: buffered packets, counters, sequence numbers, acknowledgements, user subscription information, security keys, and timers.

Freezing state means that the function stops processing packets such that the state is no longer updated. Packets that are sent to the function while the state is frozen can be forwarded to the target instance of the function (step 16).

Before freezing the state, the source instance could run a preparation phase (step 14). It could e.g. assess how much state is to be transferred, and perform bandwidth allocation on the source-target link for the transfer. It could also select the best protocol to use for the state transfer (step 20). Different protocols may suit better in different situations. If TCP is to be used, the source could run the slow-start with bogus data or query the nodes on the source-target link and negotiate a higher initial window size. A further option is not to reserve anything, but to send the state transfer with some higher priority class, such as network control. This would be at the expense of regular network traffic. Either way, the source could calculate how long the relocation would take, and inform the eMME about this. This optional informing of the eMME could be done with a message from F1 to the eMME after step 14 (not shown in FIG. 5b). The eMME then takes the final go/no-go decision. This could be done by an explicit signaling to the eMME for every relocation, or by pre-provisioned rules previously received from the eMME.

The freeze-move-resume method is in particular beneficial if the state is fairly small and if the required bandwidth to transfer the state is small compared to bandwidth available to regular traffic, and if the relocation time can be kept short.

Pre-Copy Relocation Method

The pre-copy method is an attempt to decrease the time that user plane packets cannot be processed. In particular, it tries to decrease the time between "freeze state" and "resume state" in the freeze-move-resume approach. The idea is that while the source instance is processing packets, it continuously updates information elements in its user state. The frequency of these updates will differ per information element and will also depend on the traffic intensity and the type of traffic. A subset of the information elements, e.g. those that are not updated frequently, could be pre-copied to the target while the source continues to process packets. Once the source stops processing packets, only the updated and not-yet-copied information elements need to be transferred. The other steps are equal to the freeze-move-resume method.

A trivial approach to implement this method would be to pre-copy the entire state, then freeze, then copy the information elements that have been updated since the pre-copy. Another approach would be to base the implementation on a "distributed database", where distribution means that copies of the same information element are kept in the source and target instance. Yet another approach would be to have a classifying period before the pre-copying. The classification would result in an "update rate" on each information element. The more frequent updates, the higher the rate. Once the classification is performed, the pre-copying is only done on those elements that have an update rate below a certain threshold. Given the threshold and the available bandwidth for the transfer, the time where no user plane processing is possible can be estimated. The threshold value or the time when no processing is possible can be negotiated with the eMME.

The pre-copy method is in particular beneficial if there is a lot of state to transfer and if large parts of the state are more or less stable.

Only-New-Flows-on-Target Relocation Method

This method is an attempt to completely eliminate the time that user plane packets cannot be processed. In particular, there is no "freeze state". The idea is that existing flows, i.e. flows that are active when the function receives the relocation command from the eMME, are processed on the source instance of the function until the flow ends. Only new flows, i.e. flows that start after the relocation command from the eMME, are processed on the target instance. In this approach, the function needs to know when a flow ends. For TCP (and SCTP) this is possible by examining the packets. For UDP a time-out mechanism could be used. If no packets for this flow have passed the function during a specific time, the context is removed, which is a similar approach as in e.g. a NAT.

F1 continues to forward uplink processed packets of existing flows to F2. F1 forwards uplink packets of new flows to F1', where F1' does the processing. In the downlink, F3 continues to send all packets to F1, where F1 forwards downlink packets for new flows to F1'. This forwarding continues until the last existing flow has ended on the source. Only then the eMME is informed and can start to send service chain rule updates.

The optional steps 15 and 25 are not context transfer of user plane packets, but transfer of e.g. policy rules, charging counters, etc. Some of this state needs to be sent to the target function before it starts processing, e.g. policy rules, and some of this state can only be sent after the source has finished processing (e.g. charging counters).

The only-new-flows-on-target method is in particular beneficial if the lifetime of the existing flows is short.

Flushing Relocation Method

This method is an attempt to limit the number of buffered user plane packets that are copied to the target function as part of the state transfer. This method is in particular beneficial for functions that act as proxy, e.g. a TCP or MPTCP proxy. These functions may have large user plane packet buffers.

The idea is that for those packets the TCP or MultiPath TCP proxy receives from the UE (uplink) and the UE's peer (downlink), it sends a TCP ACK with receiver window size 0. Receiving the first ACK with window size 0 makes the UE and the peer stop sending packets, as the allowed number of outstanding bytes is the minimum of the congestion window and the receiver window, hence 0. However, there may be other packets arriving after sending the first ACK with window size 0, as the peer may have sent additional data packets, the window allowing. Reception of these packets are also acknowledged with TCP ACK with window size 0 by the TCP or MultiPath TCP proxy. Finally, the TCP or MultiPath TCP proxy will not receive any new data packets after approximately one RTT after sending the first ACK with window size 0.

The (MP)TCP proxy continues to send already buffered data to the UE (downlink) and to the peer (uplink). During this process, some data packets may arrive from the senders, as described above. There are multiple ways to handle this situation, In the first option, the TCP or MultiPath TCP proxy repeats sending a TCP ACK with receiver window size 0, and will flush those packets subsequently. Also, when sending the first TCP ACK with window size 0 the proxy starts a timer that is set to RTT or slightly larger. Before this timer expires, the relocation cannot happen, as new data packets may still arrive that needs to be flushed. In another option, the data packets arriving after the first TCP ACK with window size 0 will be part of the user plane context and will be relocated. They may or may not be acknowledged by the old TCP or MultiPath TCP proxy. As a third option, they will be forwarded on the user plane, but not via the relocation method, to the new function and buffered there. As a fourth option, they are discarded and not acknowledged by the TCP or MultiPath TCP proxy and will be re-sent by the endpoints according to the TCP algorithm at a later point after the receiver window opened again.

Eventually, all buffered packets that can be sent have been sent and the UE and the peer have acknowledged these packets. At this point in time, the relocation to the target instance is made. This step is performed using one of the previously mentioned methods, e.g. steps 14-21 in the freeze-move-resume method in FIG. 5b. After the relocation, the target instance of the proxy starts acknowledging packets to the UE and the peer with a window size >0, enabling the UE to send uplink packets and the peer downlink packets.

There may be variants to the above described procedure. The purpose, however, is that the source function empties, or "flushes", its data packet buffers before the relocation is performed. Note that in some cases it may not be possible to fully empty the buffer. E.g. in MPTCP there may be multiple subflows, and packets for one subflow are buffered because there is a dependency towards a packet on another subflow that has not yet arrived at the proxy.

Function Relocation Decision and Placement Based on Context

For the 5G architecture, it is foreseen that many nodes, in particular the core network nodes, will run in a virtualized environment (Network Function Virtualization (NFV)). It is also foreseen that the functions for processing data packets of a flow may be part of an SDN environment, where an eMME may act as SDN controller. On top of this, the 5G architecture may be an anchorless architecture as described previously.

Figure 1A:
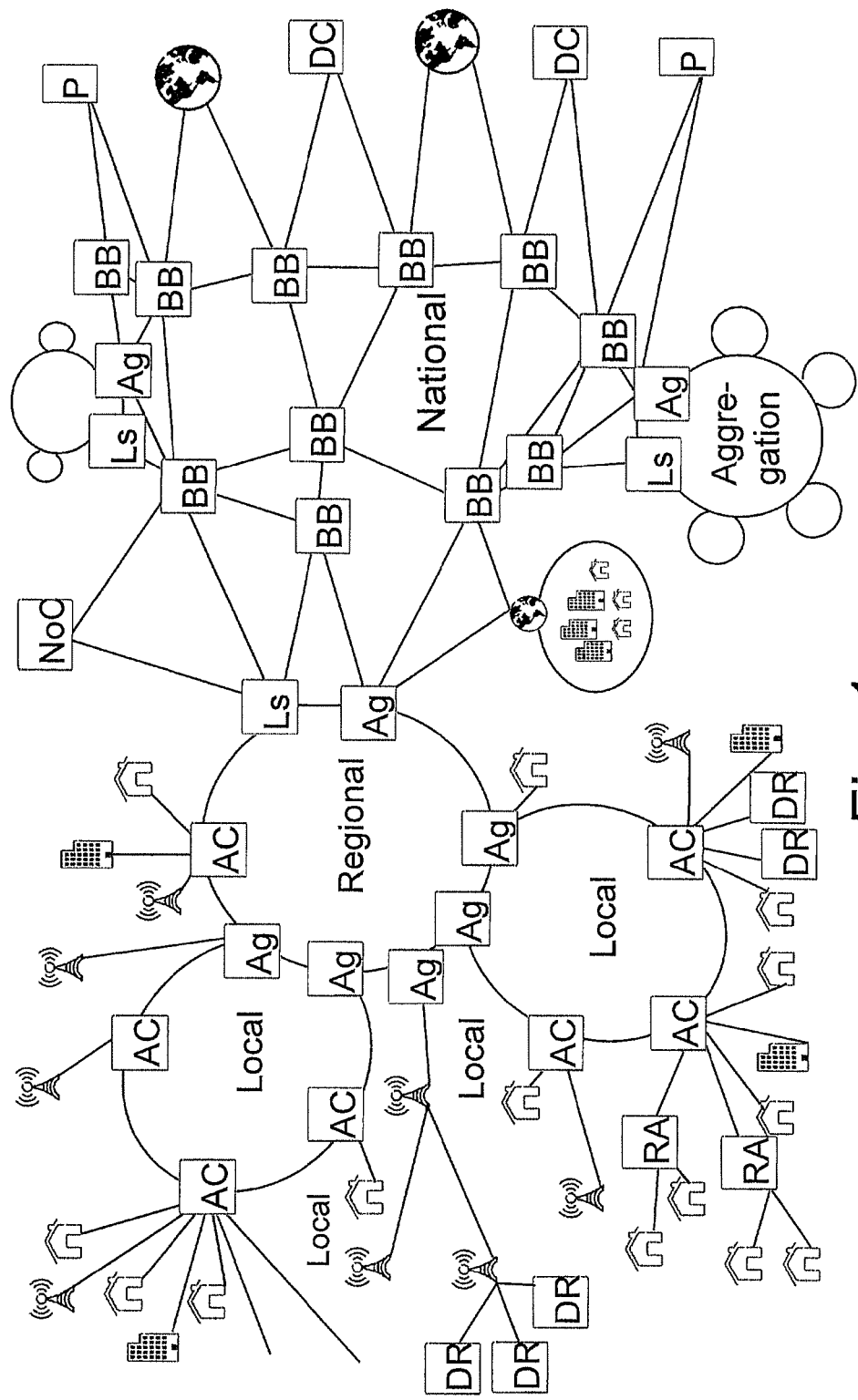
FIG. 1a is a schematic illustration of a deployment view of a communication network.
Figure 1B:
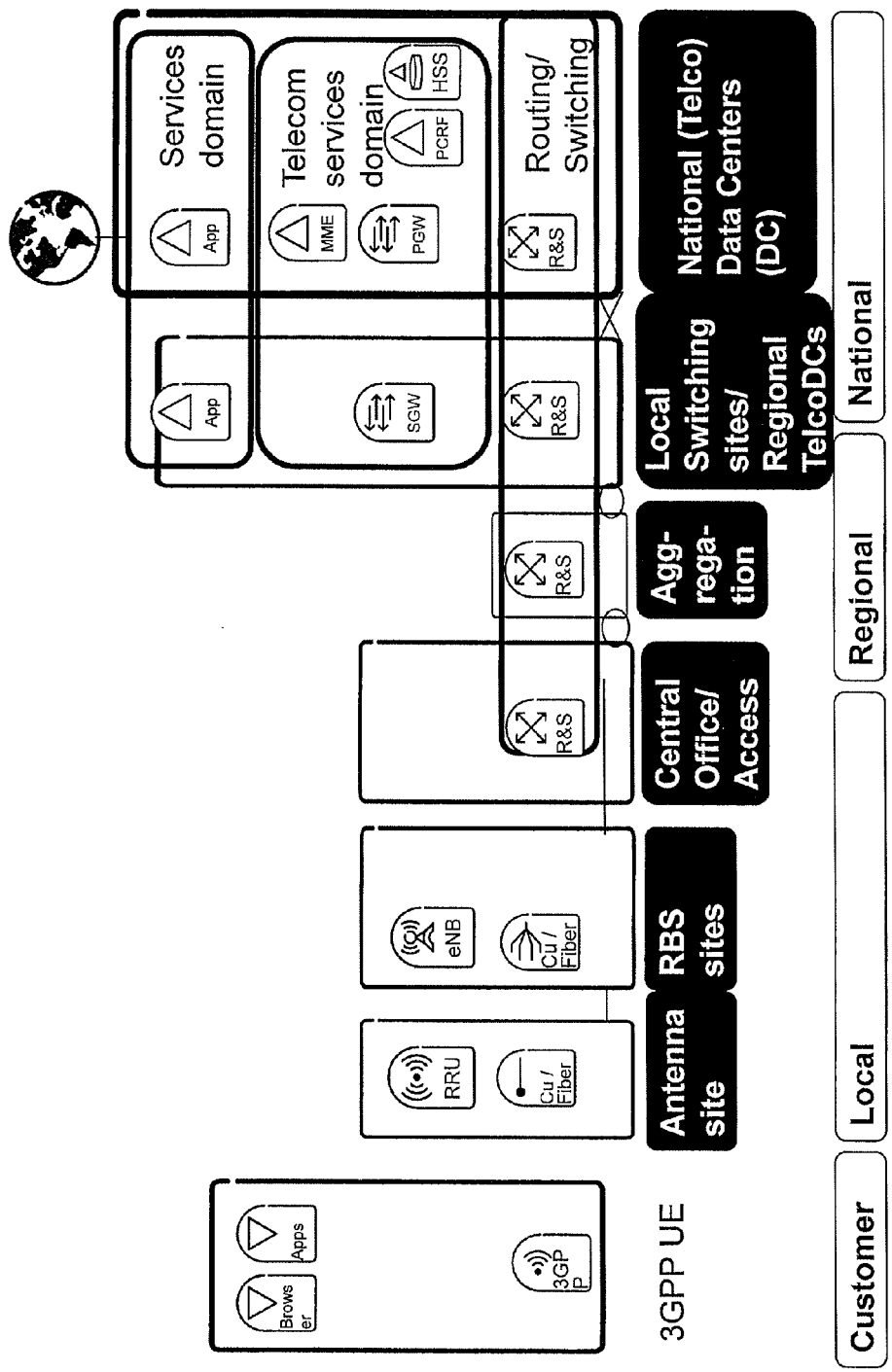
FIG. 1b is a schematic illustration of another deployment view of a communication network.
Figure 2A:
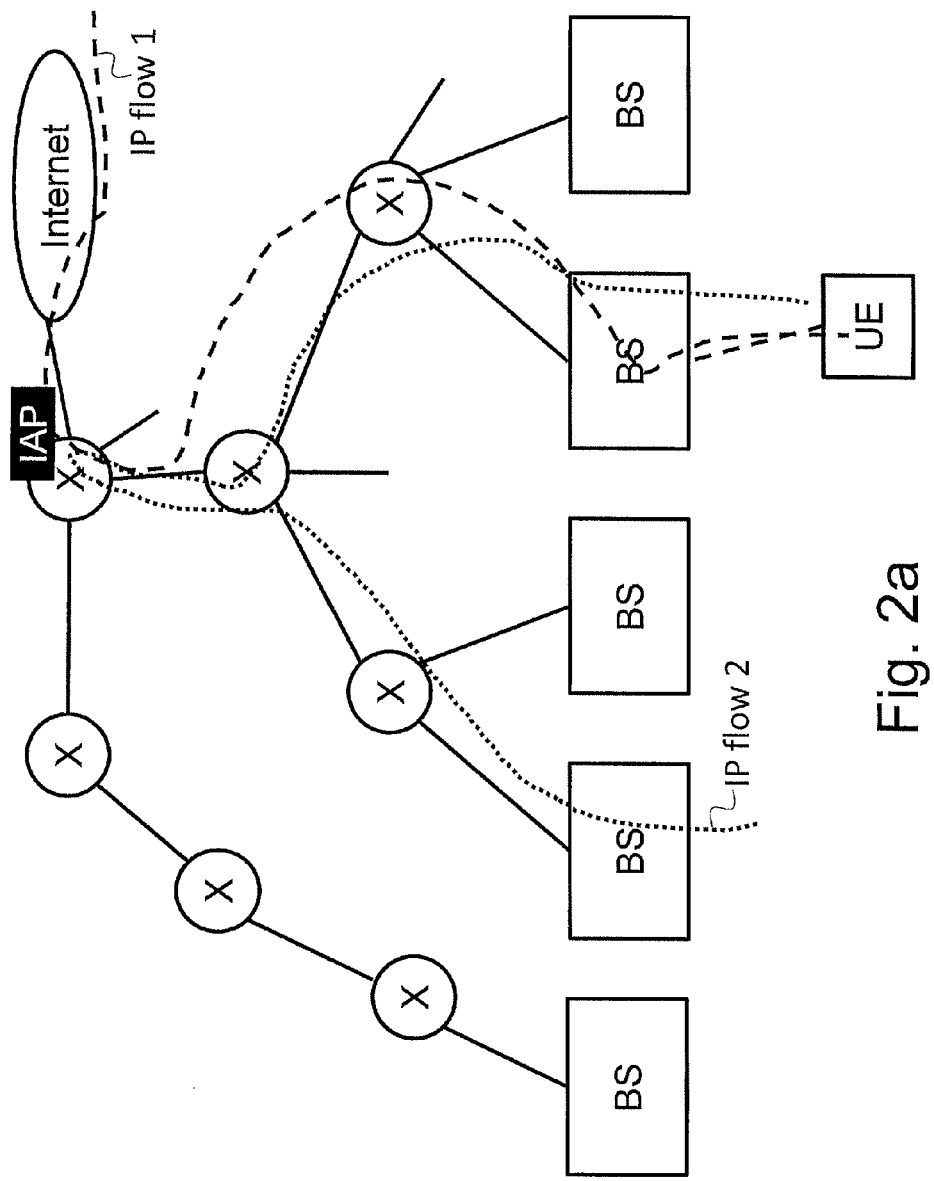
FIGS. 2a-d are schematic illustrations of routing of flows for different IAP placements in different scenarios.
Figure 2B:
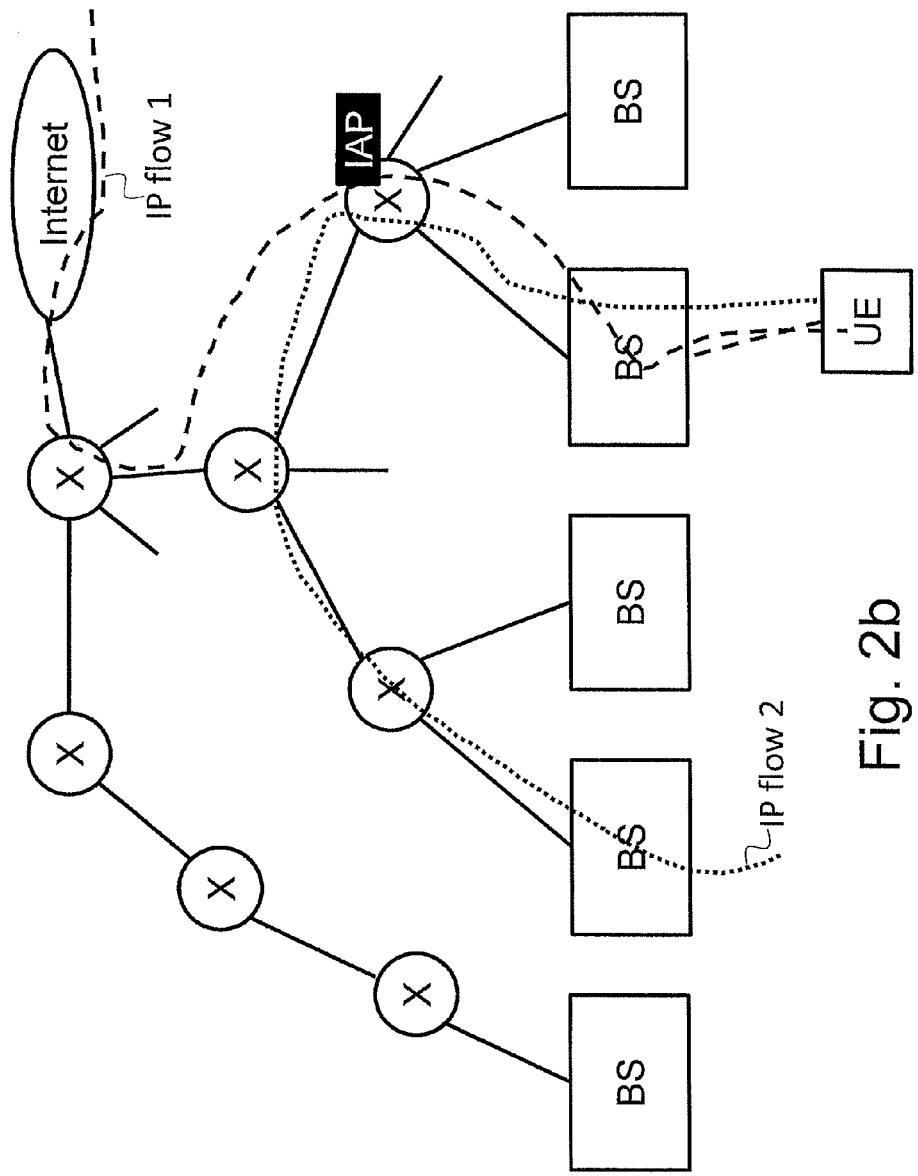
Figure 2C:
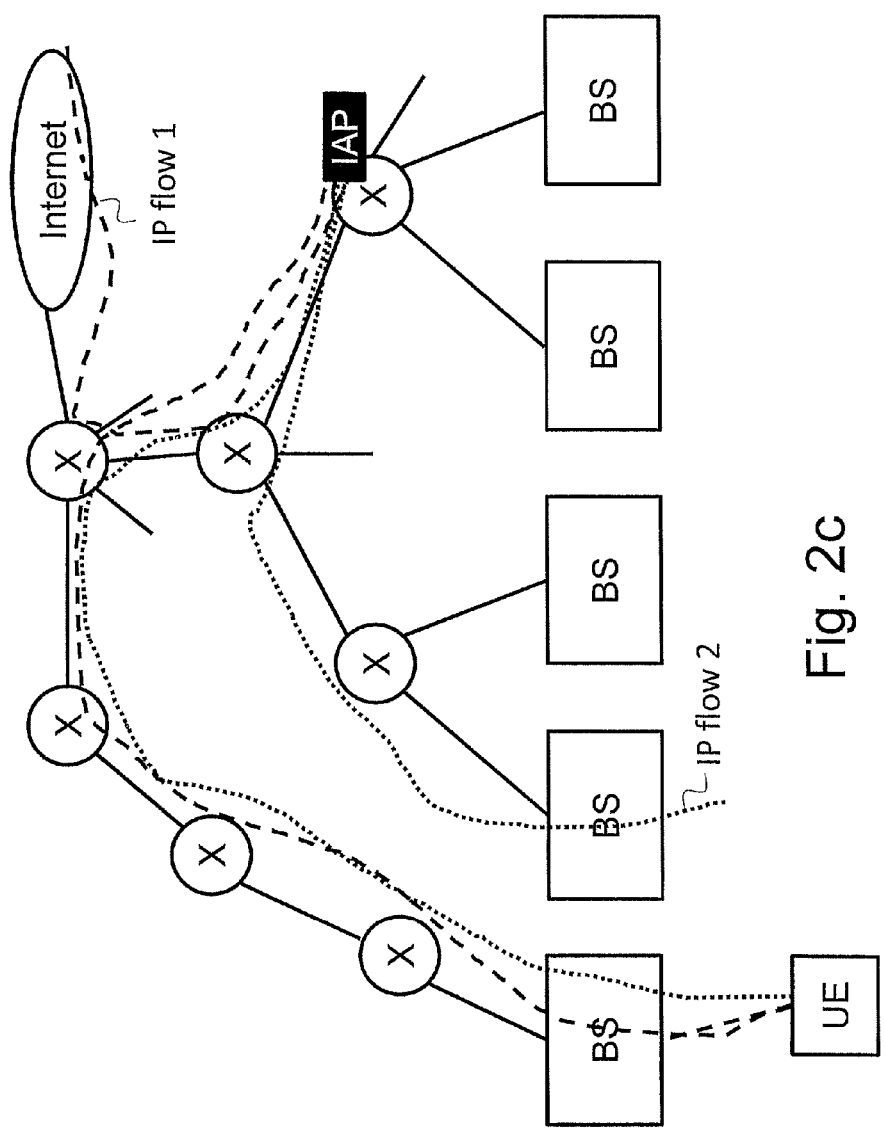
Figure 2D:
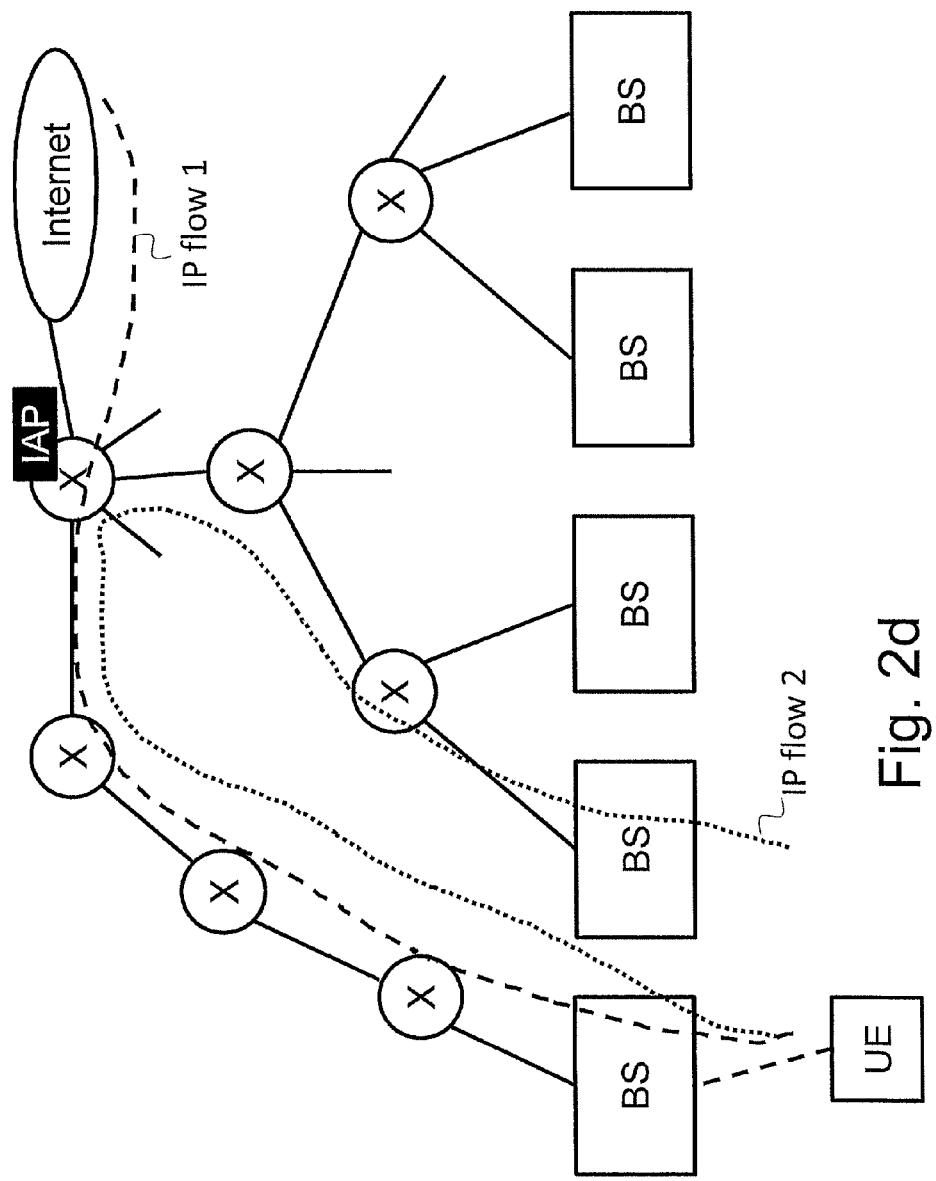

NFV, SDN and the anchorless architecture create a very flexible architecture. When it comes to deployment, it means that functions no longer are to be executed in a pre-defined physical location. E.g., in the deployment of the EPC architecture of FIG. 1*b*, DPI will be done in or close to the PGW. This means that DPI will be performed in one of the national data centers. In the flexible 5G architecture, a DPI function can run on any execution environment. It could run in an RBS site, a central office site, a regional data center or a national data center.

The flexible placement of function execution combined with the concept of function relocation, enables a large flexibility in where to place a function or where to relocate it to. However, unnecessary relocations should be avoided, while at the same time allowing for optimized routing. This problem is addressed in embodiments of the invention by letting the arrangement controlling the functions in a chain of functions take deployment and contextual information into account when making a relocation decision. Such deployment and contextual information may also be taken into account when selecting a target instance for the relocation. To some extent, the decision on what relocation method to choose may also be based on contextual information.

As already mentioned previously, embodiments are described in relation to an example scenario in the high level 5G network architecture schematically illustrated in FIG. 3. In the example scenario, the arrangement controlling the chain of functions for processing data packets of the flow associated with the device corresponds to the eMME. Before making the decision to relocate one or more of the functions F1, F2, or F3, from a source instance to a target instance of the function, the eMME may take a decision where to initially place the function(s), i.e. decide what source instance(s) to choose for the packet processing function(s). This may be done when the service chain for the device or UE associated with the flow is setup, which in one embodiment may be done when the UE attaches to the network. Once a function is placed in a certain source instance, the eMME may relocate the function to a target instance. The following list provides examples of information that can be taken into account for the relocation decision. The information may be relevant for deciding when to relocate and/or for deciding to what target instance to relocate. Some of the examples of information may also be taken into account for the initial placement of the function on the source instance. The list provides examples of information associated with a context of a function for processing data packets of a flow associated with a device or UE. The list is not exhaustive and additional embodiments may exist.

Source/destination endpoints of the flow. The connecting device may be a machine type device for which the traffic pattern can be foreseen at attachment time. If both the device and its peer are physically close to each other, then it may not be needed to let the traffic pass a regional or national site. If the two endpoints share the same RBS site, then all functions can be executed on that local site. Similarly, if the peer is on the external Internet, then the traffic has to pass a site providing peering. Functions may then be placed at the site providing the peering. In today's deployments, peering is typically only done at a few central, i.e. national, sites. At initial function placement upon attachment of the user device to the network, the eMME knows the location of the user device, but it will in many cases not know with which peers this user device will communicate. In other words, the source/destination endpoints of the traffic may not be known a priori. The eMME may therefore initiate relocation when the traffic pattern of the user device has been analyzed and implies that e.g. the route(s) can be more optimal if functions in the service chain are relocated. The traffic pattern analysis may e.g. be performed by a DPI function sniffing the user plane traffic flow and from which the eMME can acquire the analysis data. Alternatively, the DPI function may provide more or less raw DPI data and leave the analysis to the eMME.

Latency requirements: A packet processing function may have certain latency requirements. E.g. a gaming service provides best user experience if the latency between user device and gaming server is below a certain threshold. The latency of a packet travelling between a user device and a national data center may exceed that threshold, such that the eMME decides to place the gaming service on a local site. The eMME may acquire knowledge about the service and its requirements, including latency requirements, e.g. from an external or internal policy management function, such as the PCRF in the current network architecture. Alternatively, there could be a special entity responsible for handling packet processing function properties, from which the eMME could acquire the information. Yet another alternative could be that the service identification is performed by a DPI function sniffing the user plane traffic and from which the eMME can acquire the information.

Site load: The execution resources in certain sites may be overloaded. Therefore the eMME may decide to place packet processing functions on another site. The eMME may acquire this information through the control interfaces that the eMME assumedly has towards the entities at these sites. Alternatively, the eMME may acquire the information from an Operation and Maintenance (O&M) entity, which in turn may have acquired it from the entities at the concerned site. The site load can easily change over time. The eMME may initiate relocation to another site e.g. upon busy hours. Similarly, when functions are running on a local RBS site or even an antenna site, which the operator wants to shut down to save power at idle hours, relocation to a regional or other local site can be initiated. The site load may be partially caused by state transfer during relocation. Therefore, relocating functions higher up in the network may decrease the number of relocations due to mobility and may free up some of the site resources.

Expected mobility pattern for device: For stationary devices it may be best to allocate most packet processing functions close to them, e.g., in the RBS site. This would result in less processing elsewhere and also optimal routing. Highly mobile devices, on the other hand, may benefit from more centralized processing due to less function relocations. The required input data may be acquired by recording mobility statistics in the mobile terminal and/or in the network. Leveraging mobility tracking in mobile terminals with reporting of the recorded data to the network exists already today. In general, for wireless and mobile devices, the more centralized, i.e., the closer to a national data center the packet processing functions are placed the less relocations will be required. Vice versa, the more de-centralized, i.e., the closer to the transmit/receive antenna the functions are placed the more relocations will be required. Therefore, functions for which a relocation takes long time, e.g. due to the large user state, may be placed in a more central location. The user device may be a mobile device capable of performing a handover between base stations. Such movement may even imply that the traffic gets routed via another central office site when the user moves to another city, via another regional data center when the user moves to another state, or via another national data center when the user moves to another region. To achieve optimal routing, functions may be relocated depending on the new sites where the user's traffic is routed. Assuming that the eMME is involved in handovers, the eMME is inherently aware of the location of the mobile device. Combined with cellular network and transport network topology information, this allows the eMME to estimate optimal locations of packet processing functions from a routing perspective, with trade-offs against other aspects and properties when applicable. The eMME may acquire transport network topology information as described above.

History of device mobility: When a specific packet processing function is running locally on an RBS site the following may occur: The user of a device is on a train and the mobile device continuously moves between RBS sites. Continuous relocation may then become expensive in terms of network load. It may therefore be better to relocate once to a more central site like a regional data center when the history of the device mobility indicates a high mobility. When the device does not move so frequently anymore, the function can be relocated back to the local RBS site. Assuming that the eMME is involved in handovers, the eMME is inherently aware of the mobile device's movements that cause handovers. As mentioned above, the eMME may also acquire further information about the movements of the mobile device from mobility tracking in the mobile device, which is reported to the network.

Availability of certain site-specific resources: Examples of site-specific resources are packet processing functions and specific hardware. Certain types of packet processing functions may not be available, i.e. installed and instantiated, at certain sites. The eMME must choose from the ones available. The eMME may acquire this information through the control interfaces that the eMME assumedly has towards the entities at these sites. Alternatively, the eMME may acquire the information from an O&M entity, which in turn may have acquired it from the entities at the concerned site. Yet another alternative is that the eMME is configured with the information.

Function order requirements: If the UE must be allocated several functions in a chain of functions for processing data packets of the flow associated with the UE, they may be required to execute in a certain order. This may limit the eMME when selecting locations. For example, if function F2 needs to be performed after function F1 in the downlink direction and function F2 is already placed in one instance of the function, function F1 can only be placed upstream of function F2, unless relocation of function F2 is an option. The ordering requirements may be stipulated by policies/rules configured in the eMME. Alternatively, such policies/rules may be acquired from an external or internal policy management function, similar to the PCRF in the current network architecture. Such policies/rules may also be acquired from an entity responsible for handling packet processing function properties and rules for order of functions or co-location preferences for functions.

Co-location benefits: It may be that certain set of packet processing functions run more efficiently if co-located. E.g., they may frequently exchange state or may have a more efficient combined implementation. This may make the eMME more likely to co-locate them. Co-location preferences for various functions may be configured in the eMME or, alternatively, may be received from an external or internal policy management function, similar to the PCRF in the current network architecture, or an entity responsible for handling user plane function properties and rules.

Amount of context to be transferred during a relocation of a function: For certain packet processing functions like TCP or MultiPath TCP proxy, where the context to be transferred during a relocation is significantly large, the eMME may decide to place such functions more centrally to avoid frequent relocations and thus context transfers. Whereas, for other functions like PDCP where the context is not large, the eMME may decide to place the functions more locally. The eMME may acquire information about typical context sizes for different user plane functions via control interfaces towards the concerned functions. Alternatively, the eMME may acquire this information from an external or internal policy management function, similar to the PCRF in the current network architecture, or an entity responsible for handling user plane function properties and rules resulting as consequences thereof.

Transport network topology: It might be beneficial to perform packet processing functions close to transport network hubs with high transport capacity and good interconnection with other transport hubs. Relevant transport network topology information may be configured in the eMME. There are also ways to acquire transport network topology dynamically, e.g. using a link state routing protocol like Open Shortest Path First (OSPF) which can create a topology map of the transport network, or probing mechanisms like traceroute. The dynamic methods may be performed by the eMME itself or by another entity, e.g. a function operating in the user plane, from which the eMME can acquire it.

Load on links between functions: Some parts of the network may become congested due to e.g. re-routing after network failures, or temporary high load. In these cases, packet loss rates and latency will increase impacting the flows traversing the congested parts. The eMME may choose to relocate some packet processing functions when a congestion situation occurs in such a way that the flows will not pass the congested parts. For example, the path between function F1 and function F2 may become congested and packet loss ratio and latency increases. Sometimes, it may be possible to re-route the traffic from F1 to F2 via an un-congested path, but in other cases the eMME may decide to relocate function F2 to function F2', where the path between function F1 and function F2' is not congested.

The eMME may acquire information about congested links and/or the load in different parts of the transport network in general from the O&M system. The eMME may also be configured to receive load reports or overload alarms or event reports that are typically sent to the O&M system.

The functions' tolerance to interruptions. For a packet processing function that has low tolerance to interruptions it is preferable to limit the frequency or probability of relocations which may cause interruptions, and thus such functions may preferably be placed centrally. On the other hand, functions with high interruption tolerance may be placed more locally, if other circumstances favor such locations. The eMME may acquire knowledge about the service and its properties or requirements, including interruption tolerance, e.g. from an external or internal policy management function, such as the PCRF in the current network architecture. Alternatively, there could be a special entity responsible for handling packet processing function properties, from which the eMME could acquire the information. Yet another alternative could be that the service identification is performed by a DPI function sniffing the data packet traffic from which the eMME can acquire the information.

The subscription type: The type of subscription the user has may influence how different contextual information impact the placement of the functions. For instance, if the user has a premium subscription, the eMME may choose to place a delay sensitive function close to the user, i.e. locally, despite other negative results of such a placement, such as frequent or heavy and costly relocations. For a normal subscription, on the other hand, the eMME may choose a more resource efficient central location for the same function, at the cost of lower performance and/or Quality of Experience (QoE) for the user. The subscription type may be part of user/subscriber/UE related information that the eMME retrieves when the user/subscriber/UE registers in the eMME. How the subscription type impacts the placement of packet processing functions may be governed by policies and rules configured in the eMME. Alternatively, such policies/rules may be acquired from an external or internal policy management function, similar to the PCRF in the current network architecture, or an entity responsible for handling packet processing function properties and rules.

The function's complexity: For a packet processing function that is known to have a high implementation complexity and where session states are stored in arbitrary places in the application, it might be impossible to extract all required states needed for a relocation. Thus, such functions may be placed centrally. The eMME may acquire knowledge about the functions complexity, which may be hidden in a more general property reflecting a function's suitability for relocation, e.g. from an external or internal policy management function, such as the PCRF in the current network architecture. Alternatively, there could be a special entity responsible for handling packet processing function properties, from which the eMME could acquire the information. Yet another possibility could be that the service identification is performed by a DPI function sniffing the data packet traffic and from which the eMME can acquire the information.

Maintenance considerations: From a maintenance perspective it may be preferable to route traffic certain ways in the network that does not necessarily have to be the most optimal one from a routing perspective.

Information related to time needed to perform relocation: A decision to move a packet processing function to a more central location may be based on experience from previous relocations. For instance, if the preceding relocation indicated a long relocation time and/or a large state to be transferred, the eMME may decide to relocate the function to a more central location when the next relocation is due, rather than to a more local site that would otherwise have been the natural target. This decision is taken in order to avoid subsequent relocations. The experience gained from relocation time measurements may complement, refine or replace other information that may have been acquired as described above.

Method According to Embodiments

Figure 6A:
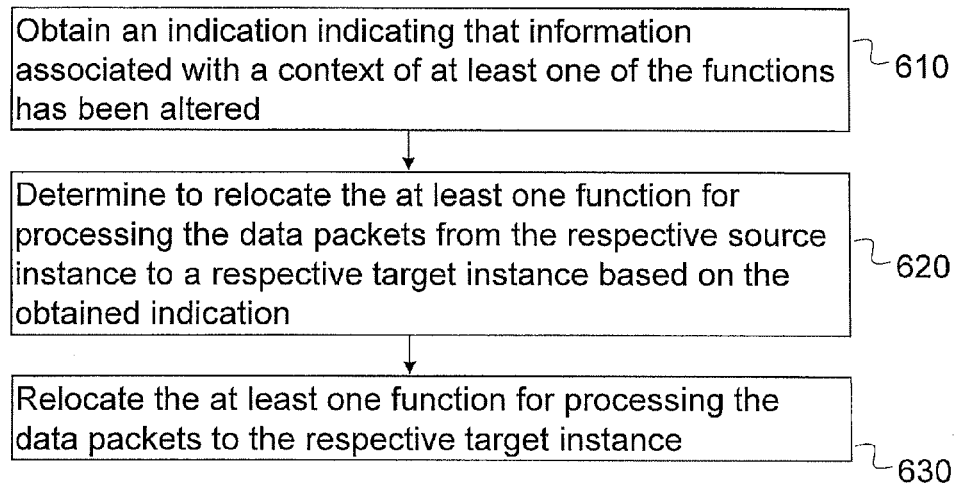
FIGS. 6a-b are flowcharts illustrating the method in the arrangement according to some embodiments of the present invention.

FIG. 6a is a flowchart illustrating one embodiment of a method for an arrangement 700 of a communication network. The arrangement controls a chain of functions for processing data packets of a flow associated with a device 710. The functions of the chain run in a distributed processing environment. The arrangement may in one embodiment correspond to the eMME described previously. The method comprises:

610: Obtaining an indication indicating that information associated with a context of at least one of the functions has been altered. The context is related to the flow and at least one of: the communication network, the device 710, a route of the flow, and a source instance 750 of each of the functions. The information associated with the context of the function(s) may e.g. comprise information related to one or more of the following: a peer device of the flow determining the destination endpoint of the flow in uplink; load in the respective source instance; load in the respective target instance; load on network links between the respective source instance of the function(s) and instances of other functions in the chain of functions processing data packets of the flow. Furthermore, the communication network may be a wireless communication network and the device may be a wireless device, and the information associated with the context of the function(s) may comprise information related to mobility of the wireless device. Other examples are also given in the list of examples of information in the previous section "Function relocation decision and placement based on context". In embodiments, the arrangement may inherently be aware of e.g. the location of a mobile device as it may be controlling handovers of the device, and the obtaining of the indication may therefore correspond to the arrangement becoming aware of context information that triggers relocation.

620: Determining to relocate the function(s) for processing the data packets from the respective source instance 750 to a respective target instance 760 based on the obtained indication. The obtaining of the indication that information associated with the context has been altered is thus the trigger to relocate. A handover of the wireless device is one example of information associated with the context and more specifically information related to mobility of the wireless device, which triggers a relocation of a function. More information is given in the example scenario illustrated in FIG. 5a, where a handover event triggers the relocation of a packet processing function. However, the list in the previous section "Function relocation decision and placement based on context" provides other examples of context information that may trigger relocation, such as a change of the load situation in source and target instances or on links between instances of functions, or a change of the destination endpoint of the flow. The step of determining to relocate may correspond to step 12: Decision to relocate in the embodiments of FIGS. 5*a-b*. The relocation may be done on a per-device basis, which means that it is determined to relocate the function only for the device associated with the flow.

630: Relocating the function(s) for processing the data packets to the respective target instance 760. The procedure for a generic relocation method is described above in section "Generic relocation method". The arrangement may transmit or at least control the transmission of an instruction to relocate the function(s) to the source instance, possibly via the target instance. One example embodiment is illustrated in FIG. 5*a*. The instruction to relocate may comprise at least one of the following: information related to routing of the data packets of the flow performed by switching elements of the chain of functions; an address of the target instance; and information identifying the flow affected by the relocation. The address of the target instance comprised in the instruction to relocate may be used by the source instance for forwarding information related to the relocation to the target instance. The arrangement may also control an update of a switching element in the chain of functions. The switching element affects the routing of the data packets of the flow in the chain. The switching element is updated with information related to the relocated function. This update is performed to inform preceding and/or succeeding switching elements about the relocation. The preceding and succeeding switching elements must not be the immediately preceding and succeeding switching elements but can be further away in the chain. As explained previously, the switching element may base its routing decision on routing rules and information in the header field of the packet, or it may mark the packet in some way e.g. by adding an extra header field so that another switching element, later in the chain, may use the mark to make its routing decision. This may correspond to step 13: Service chain rule update in the embodiments of FIGS. 5*a-b*. The switching element may be updated with information indicating a new destination for the routing of the data packets of the flow; or information indicating a new pre-defined routing path for the data packets of the flow.

Figure 6B:
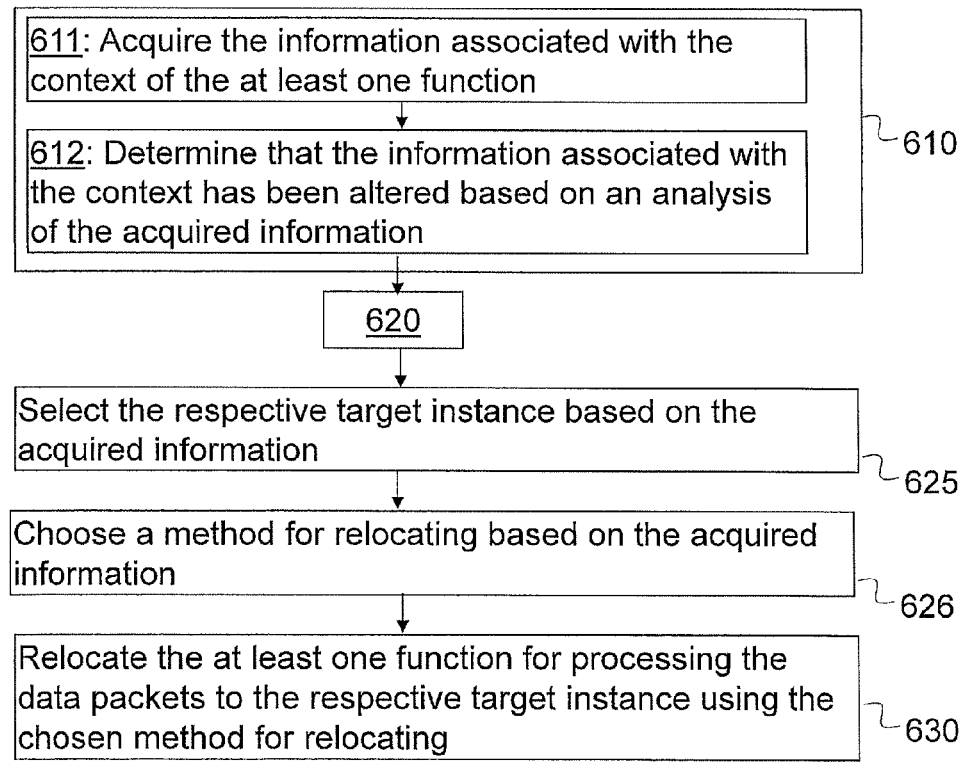

FIG. 6*b* is a flowchart illustrating another embodiment of the method in the arrangement 700. The method may comprise:

610: Obtaining the indication, which may further comprise:

611: Acquiring the information associated with the context of the function(s). The acquiring of the information may be made in different ways depending on the type of information, as described in the previous section "Function relocation decision and placement based on context". Some examples are to acquire the information from an external or internal policy management function such as the PCRF in the current network architecture, from a special entity responsible for handling packet processing function properties, from an O&M entity, or from a DPI function sniffing the data packet traffic flow.

612: Determining that the information associated with the context has been altered based on an analysis of the acquired information. The analysis of the acquired information may comprise a comparison of the acquired information with a previous version of the information associated with the context. Thereby it may be determined that the information associated with the context has been altered based on the comparison.

620: Determining to relocate the function(s) for processing the data packets from the respective source instance 750 to the respective target instance 760 based on the obtained indication. The trigger to relocate is thus the indication that information associated with the context has been altered.

625: Selecting the respective target instance based on the acquired information associated with the context of the function(s). The respective target instance may e.g. be selected based on information related to one or more of the following: latency requirement of the function(s); hardware resource requirements of the function(s); a rule specifying an order of functions in the chain of functions; preference of co-location with another function of the chain of functions; topology of transport network; a subscription of the device; a maintenance plan. However, other examples are provided in the list in the previous section "Function relocation decision and placement based on context". It may be other types of information associated with the context that are used for selecting the target instance compared to what is used to determine whether to relocate.

626: Choosing a method for relocating based on the acquired information associated with the context of the function(s). Choosing the method to use for the relocation may be based on e.g. a capability or quality of the function such as the function's complexity or tolerance to interruptions, the function's deployment in the communication network, and a characteristic of the data packets of the flow. Other parameters to base the relocation method choice on may be a property of the function, such as the size of the context to be transferred between the source and target instances, or a property of the transport network links to be used for the transfer of context for the relocation, such as a traffic load or an expected data rate of the transport network links, or an expected time required for the transfer.

630: Relocating the function(s) for processing the data packets to the respective target instance using the chosen method for relocating.

In any of the above embodiments described with reference to FIG. 6*a-b*, the chain of functions for processing data packets may be part of an SDN environment in which the arrangement acts as the SDN controller.

Arrangement According to Embodiments

Figure 7A:
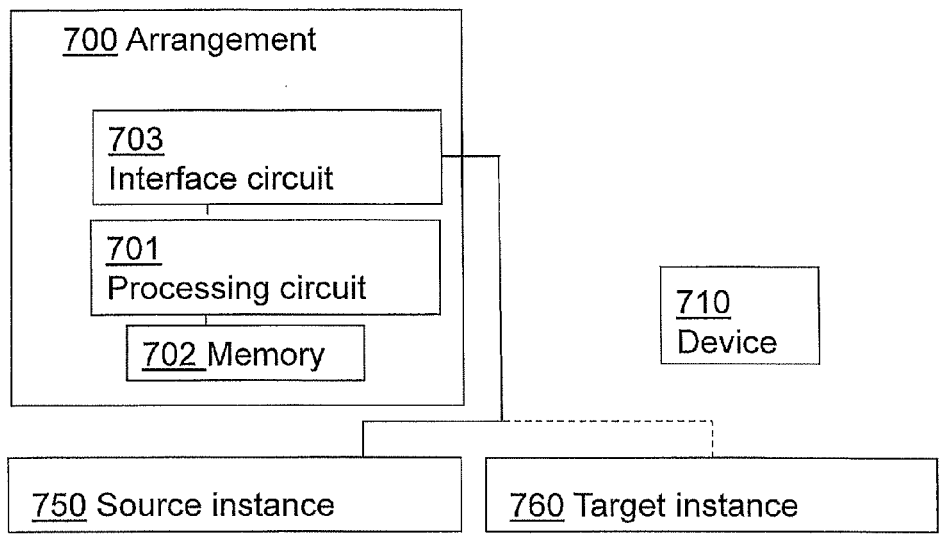
FIGS. 7a-b are block diagrams schematically illustrating the arrangement according to some embodiments of the present invention.

An embodiment of an arrangement 700 for a communication network is schematically illustrated in the block diagram in FIG. 7*a*. The arrangement 700 is configured to control a chain of functions for processing data packets of a flow associated with a device 710. The functions of the chain run in a distributed processing environment. The arrangement is further configured to obtain an indication indicating that information associated with a context of at least one of the functions has been altered. The context is related to the flow and one or more of the communication network, the device 710, a route of the flow, and a source instance 750 of each of the function(s). The arrangement is further configured to determine to relocate the function(s) for processing the data packets from the respective source instance 750 to a respective target instance 760 based on the obtained indication. The arrangement is also configured to relocate the function(s) for processing the data packets to the respective target instance 760.

The arrangement 700 may be further configured to obtain the indication by acquiring the information associated with the context of the function(s), and determining that the information associated with the context has been altered based on an analysis of the acquired information. The analysis of the acquired information may comprise a comparison of the acquired information with a previous version of the information associated with the context. The arrangement may be configured to determine that the information associated with the context has been altered based on the comparison.

Furthermore, the information associated with the context of the function(s) may comprise information related to one or more of the following: a peer device of the flow determining the destination endpoint of the flow in uplink; load in the respective source instance: load in the respective target instance; load on network links between the respective source instance of the function(s) and instances of other functions in the chain of functions processing data packets of the flow. In embodiments, the communication network may be a wireless communication network and the device may be a wireless device, and the information associated with the context of the function(s) may comprise information related to mobility of the wireless device.

The arrangement may be further configured to select the respective target instance based on the acquired information associated with the context of the function(s). The arrangement 700 may be further configured to select the respective target instance based on information related to one or more of the following: latency requirement of the function(s); hardware resource requirements of the function(s); a rule specifying an order of functions in the chain of functions; preference of co-location with another function of the chain of functions; topology of transport network; a subscription of the device; and a maintenance plan.

The arrangement 700 may be further configured to choose a method for relocating based on the acquired information associated with the context of the function(s), and relocate the function(s) for processing the data packets to the respective target instance using the chosen method for relocating.

In embodiments of the invention, the arrangement 700 may comprise a processing circuit 701 and a memory 702 as illustrated in FIG. 7a. The arrangement 700 may also comprise an interface circuit 703 configured to communicate with the source and target instances, 750, 760, either directly or by controlling the communication via another node of the communication network. The memory 702 may contain instructions executable by said processing circuit 701 whereby the arrangement 700 is operative to obtain an indication indicating that information associated with a context of at least one of the functions has been altered. The context is related to the flow and at least one of the communication network, the device, a route of the flow, and a source instance of each of the function (s). The arrangement 700 is further operative to determine to relocate the function(s) for processing the data packets from the respective source instance 750 to a respective target instance 760 based on the obtained indication. The arrangement 700 is also operative to relocate the function(s) for processing the data packets to the respective target instance 760.

Figure 7B:
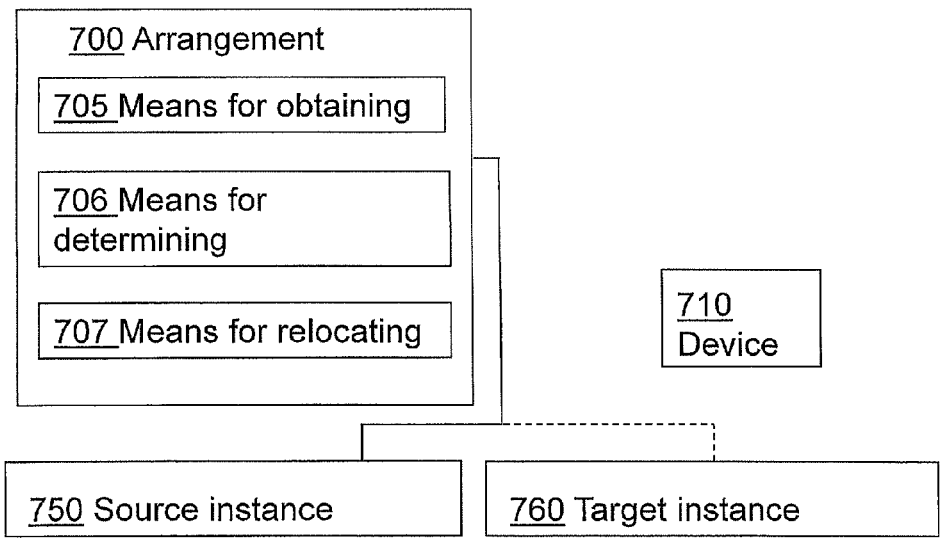

In an alternative way to describe the embodiment in FIG. 7a, illustrated in FIG. 7b, the arrangement 700 may comprise a means for obtaining 705 adapted to obtain an indication indicating that information associated with a context of at least one of the functions has been altered. The context is related to the flow and at least one of the communication network, the device, a route of the flow, and a source instance of each of the function (s). The arrangement 700 may also comprise means for determining 706 adapted to determine to relocate the function(s) for processing the data packets from the respective source instance 750 to a respective target instance 760 based on the obtained indication. The arrangement 700 may further comprise means for relocating 707 adapted to relocate the function(s) for processing the data packets to the respective target instance 760. The means described above with reference to FIG. 7b are functional units which may be implemented in hardware, software, firmware or any combination thereof. In one embodiment, the means are implemented as a computer program running on a processor.

In still another alternative way to describe the embodiment in FIG. 7a, the arrangement 700 may comprise a Central Processing Unit (CPU) which may be a single unit or a plurality of units. Furthermore, the arrangement may comprise at least one computer program product (CPP) in the form of a non-volatile memory, e.g. an EEPROM (Electrically Erasable Programmable Read-Only Memory), a flash memory or a disk drive. The CPP may comprise a computer program, which comprises code means which when run on the CPU of the arrangement causes the arrangement to perform the methods described earlier in conjunction with FIGS. 6a-b. In other words, when said code means are run on the CPU, they correspond to the processing circuit 701 in FIG. 7a.

The above mentioned and described embodiments are only given as examples and should not be limiting. Other solutions, uses, objectives, and functions within the scope of the accompanying patent claims may be possible.

The invention claimed is:

1. A method for an arrangement of a communication network, wherein the arrangement controls a chain of functions for processing data packets of a flow associated with a device, wherein the functions of the chain run in a distributed processing environment, the method comprising:
   obtaining an indication indicating that information associated with a context of at least one of the functions has been altered, the context being related to the flow and at least one of the communication network, the device, a route of the flow, and a source instance of each of the at least one function;
   determining to relocate the at least one function for processing the data packets from the respective source instance to a respective target instance based on the obtained indication; and
   relocating the at least one function for processing the data packets to the respective target instance.

2. The method according to claim 1, wherein obtaining the indication further comprises:
   acquiring the information associated with the context of the at least one function; and
   determining that the information associated with the context has been altered based on an analysis of the acquired information.

3. The method according to claim 2, wherein the analysis of the acquired information comprises a comparison of the acquired information with a previous version of the information associated with the context, and wherein it is determined that the information associated with the context has been altered based on the comparison.

4. The method according to claim 2, further comprising: selecting the respective target instance based on the acquired information associated with the context of the at least one function.

5. The method according to claim 4, wherein the respective target instance is selected based on information related to at least one of the following: latency requirement of the at least one function; hardware resource requirements of the at least one function; a rule specifying an order of functions in the chain of functions; preference of co-location with another function of the chain of functions; topology of transport network; a subscription of the device; and a maintenance plan.

6. The method according to claim 1, wherein the communication network is a wireless communication network and the device is a wireless device, and wherein the information associated with the context of the at least one function comprises information related to mobility of the wireless device.

7. The method according to claim 2, further comprising: choosing a method for relocating based on the acquired information associated with the context of the at least one function,
wherein the at least one function for processing the data packets is relocated to the respective target instance using the chosen method for relocating.

8. The method according to claim 1, wherein the information associated with the context of the at least one function comprises information related to at least one of the following: a peer device of the flow determining the destination endpoint of the flow in uplink; load in the respective source instance; load in the respective target instance; and load on network links between the respective source instance of the at least one function and instances of other functions in the chain of functions processing data packets of the flow.

9. A computer program product comprising a non-transitory computer readable medium and a computer program which, when run on the arrangement of claim 1, performs the method of claim 1.

10. An arrangement for a communication network, wherein the arrangement is configured to control a chain of functions for processing data packets of a flow associated with a device, wherein the functions of the chain run in a distributed processing environment, the arrangement being further configured to:
obtain an indication indicating that information associated with a context of at least one of the functions has been altered, the context being related to the flow and at least one of the communication network, the device, a route of the flow, and a source instance of each of the at least one function;
determine to relocate the at least one function for processing the data packets from the respective source instance to a respective target instance based on the obtained indication; and
relocate the at least one function for processing the data packets to the respective target instance.

11. The arrangement according to claim 10, further configured to obtain the indication by:
acquiring the information associated with the context of the at least one function; and
determining that the information associated with the context has been altered based on an analysis of the acquired information.

12. The arrangement according to claim 11, wherein the analysis of the acquired information comprises a comparison of the acquired information with a previous version of the information associated with the context, the arrangement being configured to determine that the information associated with the context has been altered based on the comparison.

13. The arrangement according to claim 11, further configured to:
select the respective target instance based on the acquired information associated with the context of the at least one function.

14. The arrangement according to claim 13, further configured to select the respective target instance based on information related to at least one of the following: latency requirement of the at least one function; hardware resource requirements of the at least one function; a rule specifying an order of functions in the chain of functions; preference of co-location with another function of the chain of functions; topology of transport network; a subscription of the device; and a maintenance plan.

15. The arrangement according to claim 11, further configured to:
choose a method for relocating based on the acquired information associated with the context of the at least one function; and
relocate the at least one function for processing the data packets to the respective target instance using the chosen method for relocating.

16. The arrangement according to claim 10, wherein the communication network is a wireless communication network and the device is a wireless device, and wherein the information associated with the context of the at least one function comprises information related to mobility of the wireless device.

17. The arrangement according to claim 10, wherein the information associated with the context of the at least one function comprises information related to at least one of the following: a peer device of the flow determining the destination endpoint of the flow in uplink; load in the respective source instance; load in the respective target instance; and load on network links between the respective source instance of the at least one function and instances of other functions in the chain of functions processing data packets of the flow.

* * * * *